May 25, 1948.  W. R. PRICE  2,442,311
COMPOSITE COMPRESSIBLE GASKET
Filed April 30, 1946
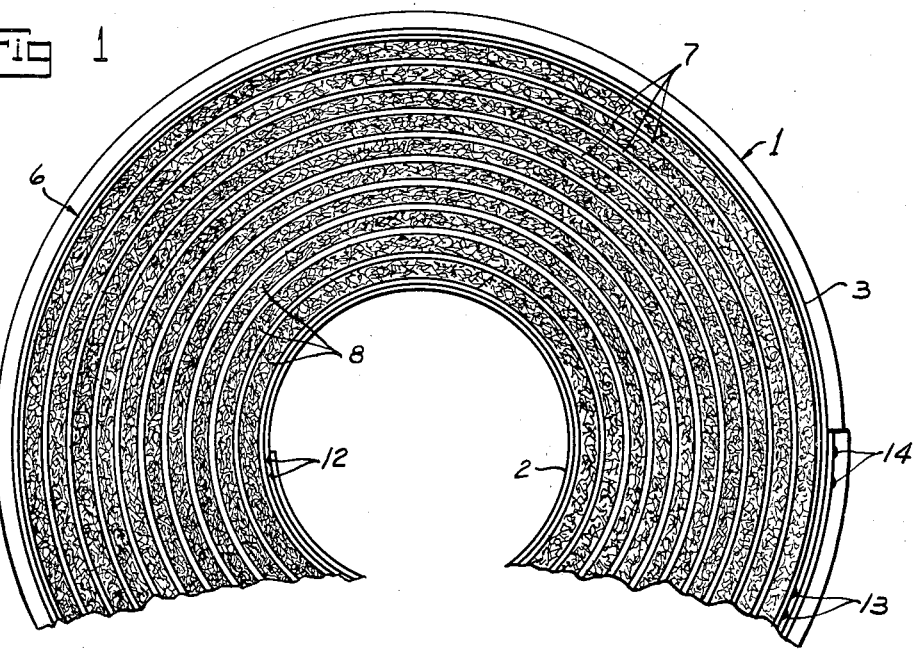
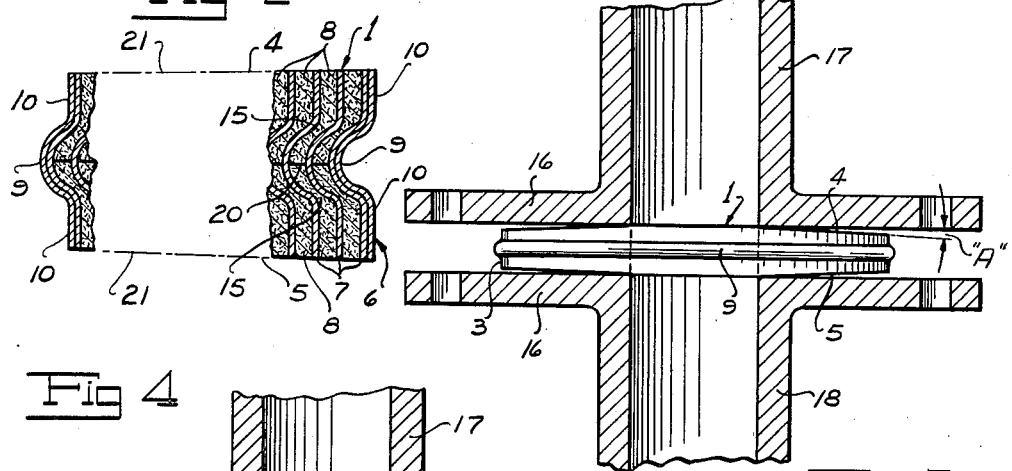
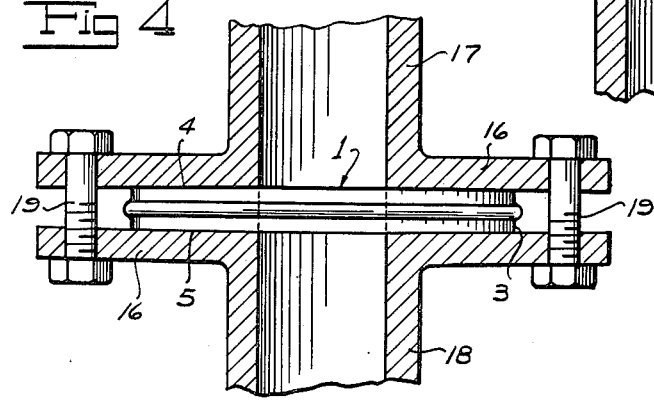
INVENTOR.
WILLIAM R. PRICE
BY
*A. L. Leek*
ATTORNEY Patented May 25, 1948

2,442,311

UNITED STATES PATENT OFFICE 2,442,311

COMPOSITE COMPRESSIBLE GASKET

William R. Price, Rosemont, Pa., assignor to Flexitallic Gasket Company, Camden, N. J., a corporation of New Jersey Application April 30, 1946, Serial No. 666,101

3 Claims. (Cl. 288—27)

This invention relates to composite compressible gaskets of the same general type as the gasket disclosed in the Henry H. Bohmer Patent No. 1,829,709, issued October 27, 1931.

Gaskets of this type are extensively used in all types of high pressure fluid systems and generally comprise a spirally wound longitudinally corrugated metallic strip, and strips of suitable non-metallic packing material wound in alternate convolutions therewith. They are made in many different sizes and shapes, depending upon their intended use. The central opening through the gasket may be circular, elliptical, square, or any other desired shape.

While gaskets of this type have excellent sealing qualities, nevertheless there are certain sources of possible leakage when the gaskets are subjected to severe use as in high pressure steam pipes where a complete seal is essential. For example the space between the strips of packing material forms a spiral channel through which leakage can occur. Also high pressures require that the bolt flanges be highly stressed in order to maintain the necessary pressure on the opposing gasket surfaces. Such stressing of the flanges causes them to flex slightly and thus tends to decrease the pressure exerted on the inner periphery of the gasket as compared to that exerted on the outer periphery which is nearer the bolt circle. The sealing efficiency is thus reduced as the entire surface is not subjected to optimum pressure.

An object of the present invention is to provide a gasket in which the above difficulties are avoided.

Another object is to provide an efficient dependable gasket for sealing high pressure lines.

Various other objects and advantages will be apparent as the nature of the invention is more fully understood.

In accordance with the present invention, I so construct the filler material that the inner edges of the two filler strips are in firm contact so as to avoid any spiral leakage channel through the gasket. The filler strips are locked or secured against outward movement by the metal strip itself which is shaped to compress and grip the strip at an appropriate point in its transverse section.

I provide for a uniform surface pressure across the gasket regardless of flexing of the pipe flanges by forming the gasket with surfaces which incline outwardly at about the same angle as that taken by the flexed flanges. The gasket is thus slightly tapered or wedge-shape in section. When the pipe flanges are placed under pressure by tightening the securing bolts, the entire surface of the gasket is subjected to the same pressure and a uniform compression or deformation takes place. Hence maximum sealing efficiency is obtained across the entire area of the gasket.

Although the novel features which are believed to be characteristic of this invention are pointed out more particularly in the claims appended hereto, the nature and scope of the invention will be better understood by referring to the following description taken in connection with the accompanying drawing in which a specific embodiment thereof has been set forth for purposes of illustration.

In the drawing:

Fig. 1 is a fragmentary plan view of a circular gasket constructed according to my invention;

Fig. 2 is an enlarged fragmentary section through a portion of the gasket showing the taper greatly exaggerated;

Fig. 3 is a sectional view through two aligned sections of pipe with a gasket constructed according to my invention disposed between the pipe flanges before the connecting bolts have been tightened up; and Fig. 4 is a view similar to Fig. 3, with the flange connecting bolts drawn up to tightly clamp the gasket between the flanges.

Referring to the drawings by reference characters the numeral 1 indicates a completed gasket having an inner periphery 2, an outer periphery 3 and flat sealing surfaces 4 and 5. The surfaces 4 and 5 converge at a very slight angle, from the inner periphery 2 to the outer periphery 3 as is clearly shown in Figs. 2 and 4. The angle of convergence A (Fig. 4) of each surface is preferably about 4° for a gasket up to six inches in diameter, although it may be slightly more or less as required.

The gasket consists of a continuous metallic strip 6 wound edgewise to provide a plurality of convolutions 7 with interposed strips 8 of non-metallic packing material simultaneously wound therewith.

Prior to winding the metallic strip 6 is passed between suitable forming rolls which form a centrally disposed longitudinally extending bead 9 therein, between two aligned flat surfaces 10. The strips 6 and 8 are then wound upon a mandrel having a peripheral contour corresponding to the shape of the gasket. The metallic strip 6 is wound upon the mandrel for one convolution and is then spot welded together again as indicated at 12. The non-metallic material 8 in the form of two asbestos composition strips is then applied from each side and the metallic and the non-metallic strips are spirally wound together in alternate convolutions until the gasket is the desired size. The non-metallic material is then discontinued and then the outer turn of the metallic strip is spot welded to the underlying convolution just past the end of the non-metallic material as indicated at 13. After this the metallic strip is wound upon itself for several more convolutions and then the end of the strip is spot welded to the underlying convolutions as indicated at 14. The completed gasket is then stripped from the mandrel.

As the gasket is being formed the convolutions are pressed tightly together between the mandrel and a cooperating guiding and forming member which also confines and tapers the sides of the gasket in the manner disclosed in my copending application Serial No. 651,594, filed March 2, 1946.

The filler strips 8 are sufficiently wide to extend from the side walls of the forming member to the center line of the metal strip so that they are pressed together by the side walls and brought into firm contact at the center as indicated at 20 (Fig. 2).

The bead 9 provides the necessary transverse flexibility for causing the metal strip 6 to conform in width to the side walls of the forming member. The sides of the strip 6 are thus forced closer together as indicated at 21 (Fig. 2) as the strip 6, originally of uniform width, is compressed to a narrower width as required to form a tapered gasket. The strips of non-metallic filler material are pinched between the convolutions of the metallic material at the point marked 15 in Fig. 2 and are thus held against separation after the gasket has been removed from the forming member. The shape of the bead 9 is such that the filler material 8 is pinched and gripped at the base of the bead as indicated at 15.

In Figs. 3 and 4 I have illustrated one way in which gaskets of this type are extensively used. The gasket 1 is placed between the flanges 16 on the ends of two aligned pipe sections 17 and 18. The flanges 16 are then secured together by a plurality of bolts 19 with the gasket 1 tightly compressed between them to effectively seal the junction.

As has been pointed out the flanges 16 will flex a slight amount when the bolts 19 are tightened. With gaskets constructed according to my invention the sealing surfaces extend parallel to the slope taken by the flanges. Hence the gasket will be compressed uniformly throughout, and the proper sealing pressure may be effected over the entire contact area. My improved gasket thus provides a complete seal both at the contacting surfaces and at the medial line of the spiral where the filler strips join.

From the foregoing it will be apparent that I have provided a very simple and efficient gasket of the composite compressible type.

It is to be understood that I am not limited to the specific construction shown and described herein as various modifications can be made thereto within the scope of the appended claims.

What is claimed is:

1. A composite compressible gasket for sealing pipe flanges or the like having a bolt circle external to the gasket, comprising a spirally wound continuous metal strip having a longitudinally extending central bead providing transverse resilience and a layer of non-metallic compressible packing material spirally wound between the convolutions of the metal strip and extending from edge to edge thereof to form with said metal strip composite sealing surfaces on the two sides of the gasket, the sides of said bead being formed progressively closer together from the inner periphery to the outer periphery of said gasket as the same is wound with the overall width of said strip correspondingly decreased so that the composite sealing surfaces taper from a maximum gasket thickness at its inner periphery to a minimum gasket thickness at its outer periphery, said taper corresponding to the flexing of said flanges when under the stress of the securing bolts and being adapted to provide a uniform sealing pressure across the entire width of the gasket.

2. A composite compressible gasket for sealing pipe flanges or the like having a bolt circle external to the gasket, comprising a spirally wound continuous metal strip having a longitudinally extending central bead providing transverse resilience and a pair of strips of non-metallic compressible packing material spirally wound between the convolutions of the metal strip, said non-metallic strips extending entirely across the metal strip from edge to edge thereof to form with said metal strip composite sealing surfaces, said packing strips joining at the center line of said bead to completely close the area between the metal convolutions, the sides of said bead being formed progressively closer together from the inner periphery to the outer periphery of said gasket as the same is wound with the overall width of said strip correspondingly decreased so that the composite sealing surfaces taper from a maximum gasket thickness at its inner periphery to a minimum gasket thickness at its outer periphery, said taper corresponding to the flexing of said flanges when under the stress of the securing bolts and being adapted to provide a uniform sealing pressure across the entire width of the gasket.

3. A composite compressible gasket for sealing pipe flanges or the like having a bolt circle external to the gasket, comprising a spirally wound continuous metal strip initially of uniform width and having a longitudinally extending central bead providing transverse resilience, and a layer of non-metallic compressible packing material spirally wound between the convolutions of the metal strip and extending from edge to edge thereof to form with said metal strip composite sealing surfaces on the two sides of the gasket, the sides of said bead being formed progressively closer together from the inner periphery to the outer periphery of said gasket as the same is wound with the overall width of said strip correspondingly decreased so that the composite sealing surfaces taper from a maximum gasket thickness at its inner periphery to a minimum gasket thickness at its outer periphery, said taper corresponding to the flexing of said flanges when under the stress of the securing bolts and being adapted to provide a uniform sealing pressure across the entire width of the gasket.

WILLIAM R. PRICE.

REFERENCES CITED

The following references are of record in the file of this patent:

UNITED STATES PATENTS

| Number | Name | Date |
| --- | --- | --- |
| 1,030,055 | Darlington | June 18, 1912 |
| 1,829,709 | Bohmer | Oct. 27, 1931 |
| 2,192,739 | Goetze | Mar. 5, 1940 |